United States Patent [19]

Tashiro et al.

[11] Patent Number: 5,082,597

[45] Date of Patent: Jan. 21, 1992

[54] SINTERED SILICON CARBIDE COMPOSITE

[75] Inventors: Hiroshi Tashiro; Yoshio Nakamura; Masatoshi Ohnishi, all of Hadano, Japan

[73] Assignee: Toshiba Ceramics Co., Ltd., Tokyo, Japan

[21] Appl. No.: 411,666

[22] Filed: Sep. 25, 1989

[30] Foreign Application Priority Data

Sep. 26, 1988 [JP] Japan ................. 63-240325

[51] Int. Cl.$^5$ .............. C04B 35/56; C04B 35/58; C04B 35/12
[52] U.S. Cl. .................. 252/516; 252/504; 501/89; 501/91; 501/92; 501/93
[58] Field of Search ............... 501/89, 91, 92, 93; 252/504, 516

[56] References Cited

U.S. PATENT DOCUMENTS

2,406,275  8/1946  Wejnarth .................. 501/89
4,379,852  4/1983  Watanabe et al. .......... 501/89

FOREIGN PATENT DOCUMENTS

63-282162  11/1988  Japan .

*Primary Examiner*—Mark L. Bell
*Attorney, Agent, or Firm*—David G. Conlin; Robert M. Asher

[57] ABSTRACT

Disclosed herein is a sintered silicon carbide composite prepared by sintering a blend comprising from 25 to 85% by weight of silicon carbide, from 1 to 25% by weight of at least one of chromium and chromium compound, from 10 to 70% by weight of at least one of carbide, nitride and boride of elements belonging to the groups IVb and Vb of the periodical table, and from 3 to 25% by weight of aluminum oxide, in an inert gas atmosphere at a temperature from 1700° to 2100° C.

7 Claims, No Drawings

SINTERED SILICON CARBIDE COMPOSITE

BACKGROUND OF THE INVENTION

The present invention relates to a sintered silicon carbide composite and, more in particular, relates to a sintered silicon carbide composite which shows low specific electrical resistivity and excellent electroconductivity, has easy fabricability for electric discharge machining and excellent mechanical strength, and can be used as structural material.

Silicon carbide is a covalent bond compound having high hardness and rigidity, low heat expansion coefficient and high decomposing temperature, and high density sintered products obtained therefrom are useful as light-weight temperature-resistant material having great strength at high temperature, high heat impact resistance and excellent abrasion resistance.

Among them, those of excellent electric insulating property and heat conductivity are used for IC substrates, electronic materials, etc.

As sintered silicon carbide product of this type, those prepared by adding carbide, nitride or boride of elements belonging to the groups IIIa or IVa of the periodical table to powdery silicon carbide and then subjecting to hot-press sintering treatment have been proposed.

For example, there have been proposed in, for example,

Japanese Patent Publication No. 63-13955 (corresponding to U.S. patent application Ser. No. 161,726 filed on June 23, 1980); "a process for producing mixed ceramic articles, comprising:
 (a) mixing about from 5 to 95 parts by weight of silicon carbide of less than 1 μm, about from 5 to 95 parts by weight of fine titanium diboride, about from 0.5 to 5.0 parts by weight of carbon or carbon source material and about from 0.2 to 3.0 parts by weight of a sintering aid,
 (b) forming the mixture into a product having a shape of an aimed article and,
 (c) sintering the thus formed product in a solid phase under substantially normal pressure, thereby obtaining a sintered article containing silicon carbide and titanium diboride", Japanese Patent Application Laid-Open (KOKAI) No. 61-26565; "a process for producing sintered SiC products, comprising:
 molding a mixture comprising at least one additive of Be, B, Al, an element of group IVa, an element of group Va, an element of group VIa or an ingredient containing such elements and the balance substantially composed of SiC, and sintering the thus molded mixture in a non-oxidative atmosphere, wherein Al or Al-containing ingredient is present together to the outside of the molding product":

Japanese Patent Application Laid-Open (KOKAI) No. 61-26566; "a method of a sintered SiC composite, comprising:
 molding a mixture comprising from 0.01 to 20% by weight (calculated as Al) of Al-containing ingredient as sintering aid, not less than 0.1% by weight of at least one of Be, B, Al, an element of group IVa, an element of group Va or an element of group VIa as an additive and the balance substantially comprised of SiC, and then sintering the thus molded mixture in a non-oxidative atmosphere": and Japanese Patent Application Laid-Open (KOKAI) No. 62-3072; "sintered silicon carbide products comprising:
 silicon carbide, from 0.5 to 35% by weight (calculated as Al to silicon carbide) of Al and/or refractory Al compound and from 2 to 99% by weight of boride of elements belonging to the group IVa, Va or VIa in the 4th, 5th and sixth period of the periodical table based on silicon carbide, as the main ingredient, and having such a structure that more than one-half amount of crystalline silicon carbide particles comprise columnar and/or plate-like crystalline silicon carbide particles", respectively.

However, if carbide, nitride or boride of elements belonging to the group IIIa or IVa of the periodical table is blended by a considerable amount in order to lower the specific electrical resistivity to ensure electroconductivity, (i) blending amount of silicon carbide is reduced relatively tending to worsen the sintering property, whereby (ii) it is necessary to produce sintered product by hot-press sintering process, and (iii) this makes it impossible to form a complicated shape for the sintered product and, as a result, (iv) the utilizable range as the structural material may be remarkably restricted sometimes.

For overcoming these problems, as a result of the present inventors' earnest study, it has been found out that a sintered silicon carbide composite obtained by sintering a blend comprising from 25 to 85% by weight of powdery silicon carbide, from 1 to 25% by weight of at least one of chromium and chromium compound, from 10 to 70% by weight of at least one of carbide, nitride and boride of elements belonging to the elements IVb and Vb of the periodical table, and 3 to 25% by weight of aluminum oxide, in an inert gas atmosphere at a temperature from 1700° to 1100° C. has low specific electrical resistivity, high electroconductivity and, excellent in mechanical strength, it is easy for electric discharge machining and can be utilizable also as structural materials. Based on this finding, the present invention has been attained.

SUMMARY OF THE INVENTION

In a first aspect of the present invention, there is provided a sintered silicon carbide composite prepared by sintering a blend comprising from 25 to 85% by weight of silicon carbide, from 1 to 25% by weight of at least one of chromium and chromium compound, from 10 to 70% by weight of at least one of carbide, nitride and boride of elements belonging to the groups IVb and Vb of the periodical table, and from 3 to 25% by weight of aluminum oxide, in an inert gas atmosphere at a temperature from 1700° to 2100° C. from 10 to 70% by weight of at least one of carbide, nitride and boride of elements belonging to the elements IVb and Vb of the periodical table, and 3 and to 25% by weight of aluminum oxide, in an inert gas atmosphere at a temperature from 1700° to 1100° C. has low specific electrical resistivity, high electroconductivity and, excellent in mechanical strength, it is easy for electric discharge machining and can be utilizable also as structural materials. Based on this finding, the present invention has been attained.

SUMMARY OF THE INVENTION

In a first aspect of the present invention, there is provided a sintered silicon carbide composite prepared by sintering a blend comprising from 25 to 85% by weight of silicon carbide, from 1 to 25% by weight of at least one of chromium and chromium compound, from 10 to 70% by weight of at least one of carbide, nitride and boride of elements belonging to the groups IVb and Vb of the periodical table, and from 3 to 25% by weight of aluminum oxide, in an inert gas atmosphere at a temperature from 1700° to 2100° C.

DETAILED DESCRIPTION OF THE INVENTION

The amount of the silicon carbide used in the present invention is from 25 to 85% by weight; in the second aspect, the amount of the silicon carbide is from 25 to 75% by weight, preferably, from 45 to 70% by weight; and in the third aspect, the amount of the silicon carbide is from 40 to 85% by weight, preferably, from 50 to 82% by weight. For the starting material of the silicon carbide used, either one of α-type and β-type may be predominant or it may be a mixture of both of them. β-type material is preferable since it tends to form columnar or plate-like particles while changing into the 4H type among the α-type. The starting silicon carbide of higher purity is preferred and it is preferable that the content of Na, K and Ca calculated as metal is not more than 0.2% by weight and, preferably, not more than 0.05% by weight so that mechanical property is not deteriorated, particularly, at high temperature. In addition, it is also preferable that $SiO_2$ content derived from the surface oxidation is small.

The grain size of the silicon carbide used is not greater than 8 μm, preferably, from 0.1 to 1.0 μm in average.

The amount of chromium and/or chromium compound used in the present invention is from 1 to 25% by weight; in the second aspect, the amount of chromium and/or chronium compound is from 1 to 5% by weight, preferably, from 2.5 to 4.5% by weight; and in the third aspect, the amount of chromium and/or chromium compound is from 5 to 25% by weight, preferably, from 7 to 15% by weight. As the chromium compound used herein, chromium silicide, chromium carbide, chromium nitride and chromium boride may be exemplified. The grain size of the chromium and/or chromium compound used is not greater than 10 μm, preferably, from 0.5 to 5 μm in average.

The amount of at least one of carbide, nitride and boride of the elements belonging to the groups IVb and Vb of the periodical table is from 10 to 70% by weight; in the second aspect, the amount of at least one of carbide, nitride and boride is from 20 to 70% by weight, preferably, from 20 to 50% by weight; and in the third aspect, the amount of at least one of carbide, nitride and boride is from 10 to 50% by weight, preferably, from 10 to 40% by weight. As the starting material used herein, carbide, nitride or boride of titanium, zirconium, tantalum, hafnium, vanadium, niobium may be exemplified. The grain size of at least one of carbide, nitride and boride of the elements belonging to the groups IVa and Va of the periodical table used herein is not greater than 10 μm, preferably, from 0.5 to 5 μm in average.

The total amount of the blending amount of at least one of chromium and chromium compound, and the blending amount of at least one of carbide, nitride and boride of elements belonging to the group IVb (for example, titanium, zirconium, hafnium, etc.) and the group Vb (for example, tantalum, vanidium, niobium, etc.) of the periodical table is preferably from 20 to 60% by weight, more preferably, from 20 to 55% by weight.

The amount of aluminum oxide used in the present invention is from 3 to 25% by weight; in the second aspect, the amount of aluminium oxide is from 3 to 25% by weight, preferably, from 3 to 15% by weight; and in the third aspect, the amount of aluminium oxide is from 5 to 25% by weight, preferably, from 5 to 15% by weight. The grain size of the aluminum oxide used herein is not greater than 10 μm preferably, from 20 nm to 1.0 μm in average.

It is not always necessary that the aluminum oxide in the present invention is added directly as $Al_2O_3$ powder, but it may be added, with no particular restriction, in the form of aluminum alkoxide, or in the form of an organic acid salt or inorganic acid salt, providing that they can be converted into $Al_2O_3$ by an appropriate treatment before the sintering.

In addition, for improving the mechanical strength of the resultant sintered silicon carbide composite by the improvement to the sintering property, carbon may be blended in an amount upto 10% by weight, preferably, upto 6% by weight. The reason why the blending amount of the carbon is restricted to not greater than 10% by weight is that the mechanical strength of the resultant sintered silicon carbide composite tends to be deteriorated if the amount exceeds 10% by weight.

If the amount of at least one of chromium and chromium compound is below 1% by weight, the electroconductivity of the resultant sintered silicon carbide composite tends to be lowered. On the other hand, if it excess 25% by weight, the sintering property is worsened and the density is lowered tending to worsen the mechanical strength.

If the amount of at least one of carbide, nitride and boride of elements belonging to the group IVb and the group Vb of the periodical table is below 10% by weight, the electroconductivity of the resultant sintered silicon carbide composite tends to be lowered. On the other hand, if it excess 70% by weight, the sintering property is worsened and the density is lowered tending to worsen the mechanical strength.

If the amount of the aluminum oxide is below 3% by weight, the sintering property is worsened and the density of the resultant sintered silicon carbide composite is lowered tending to worsen the mechanical strength. Further, if it exceeds 25% by weight, it tends to impair the mechanical strength and the electroconductivity.

The above-mentioned starting materials are weighted each by a predetermined amount, pulverized and mixed either in dry or wet process, further admixed with a molding binder, etc., if necessary, and then formed into a molding product by way of an appropriate molding process such as cast-molding, press-molding, injection molding or extrusion molding.

The resultant molding product is removed, if necessary, with the molding binder, etc. and then heated to be sintered in an inert gas atmosphere under the pressure of not higher than 10 atm, at a temperature from 1700° to 2100° C.

Sintering is conducted under pressure not higher than 10 atm, because it can easily give densification and a product of complicate and large shape can be sintered in a furnace of a simple structure and it is, particularly, preferred to conduct sintering substantially in an atmospheric pressure or a reduced pressure.

If the sintering temperature is not higher than 1700° C., the liquid phase described above is less produced and sintering does not proceed. Temperature above 1800° C. is preferred since the density of the sintered composite is increased. On the contrary, if it exceeds 2100° C., violent reaction is taken place between silicon carbide and the liquid phase to proceed decomposition. Temperature not higher than 2000° C. is preferred.

As the inert gas atmosphere, there can be mentioned, preferably, $N_2$ or Ar.

The sintered silicon carbide composite of the present invention thus obtained has relative density (%) of not less than 93%, preferably, not less than 95%; specific electrical resistivity (ohm-cm) of not greater than 10 ohm-cm, preferably not greater than 1 ohm-cm, more preferably not greater than $1 \times 10^{-1}$ ohm-cm, most preferably, less than $5 \times 10^{-2}$ ohm-cm; and bending strength (MPa) of not less than 400 MPa, preferably, not less than 450 MPa and, more preferably, not less than 500 MPa.

Accordingly, since (i) the specific electrical resistivity is lowered, it shows excellent electroconductivity and, therefore, (ii) it has easy fabricability for electric discharge machining, and since (iii) it has excellent mechanical strength, for example, high bending strength, (iv) the sintered product can be produced without using hot-press sintering process and, thus, (v) making it possible to complicate the shape of the sintered product and, as a result, (vi) it can be used as the structural material.

The present invention will be more precisely explained while referring to Examples as follows.

However, the present invention is not restricted to examples under mentioned. From the foregoing description, one skilled in the art can easily ascertain the essential characteristics of this invention, and without departing from the spirit and scope thereof, can make various changes and modifications of the invention to adapt it to various usages and conditions.

The methods of measuring the physical property of the sintered silicon carbide composite according to the present invention is as shown below.

RELATIVE DENSITY (%)

Relative density was measured according to JIS-R 2205.

SPECIFIC ELECTRICAL RESISTIVITY (OHM-CM)

Specific electrical resistivity was measured according to four point method.

BENDING STRENGTH (MPa)

Bending strength was measured according to JIS-R 1601 by using "Strength Tester Instron Model 1115", manufactured by Instron Co.

EXAMPLE 1

After adding 4 g of chromium silicide ($CrSi_2$) powder of 3.0 μm in average grain size and 32 g of titanium boride ($TiB_2$) powder of 2.0 μm in average grain size to 51 g of silicon carbide (SiC) powder of 0.5 μm in average grain size, 120 ml of acetone solution containing 5 g of phenol resin with 50% by weight of carbonization degree was further added and they were mixed under stirring for 100 hours by using a pot-mill made of aluminum, that is, a pot and balls made of aluminum.

Then, after removing the solvent by drying, the agitated mixture was pelletized into a pelletized mixture. Since the pot-mill was made of aluminum, the pelletized mixture was incorporated by about 10.5% by weight of aluminum oxide ($Al_2O_3$) (i.e., about 10.5 g) derived from the wall of the pot and the balls.

The pelletized mixture was molded by using a metal die press and a rubber press into a molding product of 5 mm × 5 mm × 60 mm. The molding product was contained in a graphite container, and sintered in an argon atmosphere at a temperature of 1900° C., thereby obtaining a sintered silicon carbide composite.

The relative density, the specific electrical resistivity and the bending strength (three-point bending strength under normal temperature, that is, room temperature) were measured for the sintered silicon carbide composite and the results of the measurement are shown in Table 1.

EXAMPLE 2

The procedures of Example 1 were repeated except for using silicon carbide (SiC) powder of 51 g, chromium silicide ($CrSi_2$) powder of 3 g and titanium boride ($TiB_2$) powder of 40 g, and reducing the content of aluminum oxide ($Al_2O_3$) to about 3.5% by weight (that is, about 3.5 g) due to the shortening of the agitating and mixing time to 50 hours.

The relative density, the specific electrical resistivity and the bending strength (three-point bending strength under normal temperature, that is, room temperature) were measured for the sintered silicon carbide composite and the results of the measurement are shown in Table 1.

EXAMPLE 3

The procedures in Example 1 were repeated except for adding 32 g of titanium carbide (TiC) powder of 2.0 μm in average grain size instead of titanium boride ($TiB_2$) powder.

The relative density, the specific electrical resistivity and the bending strength (three-point bending strength under normal temperature, that is, room temperature) were measured for the sintered silicon carbide composite and the results of the measurement are shown in Table 1.

EXAMPLE 4

The procedures in Example 1 were repeated except for adding 32 g of titanium carbide (TaC) powder of 3.0 μm in average grain size instead of tantalum boride ($TiB_2$) powder.

The relative density, the specific electrical resistivity and the bending strength (three-point bending strength under normal temperature, that is, room temperature) were measured for the sintered silicon carbide composite and the results of the measurement are shown in Table 1.

EXAMPLE 5

After adding 3 g of chromium silicide ($CrSi_2$) powder of 3.0 μm in average grain size and 37.5 g of zirconium boride ($ZrB_2$) powder of 8.0 μm in average rain size to 51 g of silicon carbide (SiC) powder of 0.5 μm in average grain size, 120 ml of an acetone solution containing 5 g of phenol resin with 50% by weight of carbonization degree was further added and they were mixed under stirring for 50 hours by using a potmill made of aluminum and, that is, a pot and balls made of aluminum.

Then, after removing the solvent by drying, the agitated mixture was pelletized into a pelletized mixture. Since the pot-mill was made of aluminum, the pelletized mixture was incorporated with about 6.0% by weight of aluminum oxide (Al$_2$O$_3$) (i.e., about 6.0 g) derived from the wall of the pot and the balls.

The pelletized mixture was molded by using a metal die press and a rubber press into a molding product of 5 mm×5 mm×60 mm. The molding product was contained in a graphite container and sintered in an argon atmosphere at a temperature of 1900° C., thereby obtaining a sintered silicon carbide composite.

The relative density, the specific electrical resistivity and the bending strength (three-point bending strength under normal temperature, that is, room temperature) were measured for the sintered silicon carbide composite and the results of the measurement are shown in Table 1.

EXAMPLE 6

Procedures in Example 5 were repeated except for using silicon carbide (SiC) powder of 48 g and titanium boride (TiB$_2$) powder of 41 g, and adding 3.0 g of chromium carbide (Cr$_3$C$_2$) powder of 5.6 μm in average grain size instead of chromium silicide (CrSi$_2$) powder, and reducing the content of the phenol resin in the acetone solution to 4.0 g.

The relative density, the specific electrical resistivity and the bending strength (three-point bending strength under normal temperature, that is, room temperature) were measured for the sintered silicon carbide composite and the results of the measurement are shown in Table 1.

EXAMPLE 7

Procedures of Example 1 were repeated except for using 57 g of the silicon carbide (SiC) powder, adding 4.0 g of chromium (Cr) powder of 1.0 μm in average grain size instead of chromium silicide (CrSi$_2$) powder, adding 25 g of titanium carbide (TiC) powder and increasing the content of the phenol resin in the acetone solution to 7 g.

The relative density, the specific electrical resistivity and the bending strength (three-point bending strength under normal temperature, that is, room temperature) were measured for the sintered silicon carbide composite and the results of the measurement are shown in Table 1.

EXAMPLE 8

Procedures in Example 1 were repeated except for using 53.5 g of silicon carbide (SiC) powder, adding 4.0 g of chromium carbide (Cr$_3$C$_2$) powder of 5.6 μm in average grain size instead of chromium silicon (CrSi$_2$) powder, adding 32 g of titanium carbide (TiC) powder of 2.0 μm in average grain size instead of titanium boride (TiB$_2$) powder and adding 2.5 g of polyvinyl acetate instead of the phenol resin.

The relative density, the specific electrical resistivity and the bending strength (three-point bending strength under normal temperature, that is, room temperature) were measured for the sintered silicon carbide composite and the results of the measurement are shown in Table 1.

EXAMPLE 9

After adding 4 g of chromium silicide (CrSi$_2$) powder of 3.0 μm in average grain size, 24 g of titanium carbide (TiC) powder of 2.0 μm in average grain size and 7.5 g of aluminum oxide (Al$_2$O$_3$) powder of 0.5 μm in average grain size to 64.5 g of silicon carbide (SiC) powder of 0.5 μm in average grain size, 150 ml of purified water containing 2.5 g of polyvinyl alcohol was further added and they were mixed under stirring for 20 hours by using a pot-mill made of plastic, that is, a plastic pot and mono-balls made of aluminum.

Then, after removing the solvent by drying, the agitated mixture was pelletized into a pelletized mixture. Since the pot-mill was made of plastic, no aluminum oxide (Al$_2$O$_3$) was incorporated from the pot wall or the balls, different from Example 1.

The pelletized mixture was molded by using a metal die press and a rubber press into a molding product of 5 mm×5 mm×60 mm. The molding product was contained in a graphite container, and sintered in an argon atmosphere at a temperature of 1900° C., thereby obtaining a sintered silicon carbide composite.

The relative density, the specific electrical resistivity and bending strength (three-point bending strength under normal temperature, that is, room temperature) were measured for the sintered silicon carbide composite and the results of the measurement are shown in Table 1.

COMPARATIVE EXAMPLE 1

After adding 20 g of chromium silicide (CrSi$_2$) powder of 3.0 μm in average grain size to 76 g of silicon carbide (SiC) powder of 0.5 μm in average grain size, 120 ml of acetone solution containing 8 g of phenol resin with 50 % by weight of carbonization degree was further added and they were mixed under stirring for 100 hours by using a pot-mill made of aluminum.

Then, after removing the solvent by drying, the agitated mixture was pelletized into a pelletized mixture. Since the pot-mill was made of aluminum, the pelletized mixture was incorporated by about 12% by weight of aluminum oxide (Al$_2$O$_3$) (i.e., about 12 g) derived from the wall of the pot and the balls.

The pelletized mixture was molded by using a metal die press and a rubber press into a molding product of 5 mm×5 mm×60 mm. The molding product was contained in a graphite container, and sintered in an argon atmosphere at a temperature of 1900° C., thereby obtaining a sintered silicon carbide composite.

The relative density, the specific electrical resistivity and bending strength (three-point bending strength under normal temperature, that is, room temperature) were measured for the sintered silicon carbide composite and the results of the measurement are shown in Table 1.

COMPARATIVE EXAMPLE 2

After adding 10 g of alminum oxide (Al$_2$O$_3$) powder of 0.5 μm in average grain size and 10 g of titanium carbide (TiC) powder of 2.0 μm in average grain size to 86 g of silicon carbide (SiC) powder of 0.5 μm in average grain size, 120 ml of acetone solution containing 8 g of phenol resin with 50% by weight of carbonization degree was further added and they were mixed under stirring for 20 hours by using a pot-mill made of plastic, that is, a plastic pot and mono-balls.

Then, after removing the solvent by drying, the agitated mixture was pelletized into a pelletized mixture. Since the pot-mill was made of plastic, no aluminum oxide (Al$_2$O$_3$) was incorporated from the pot wall or the balls, different from Comparative Example 1.

The pelletized mixture was molded by using a metal die press and a rubber press into a molding product of 5 mm×5 mm×60 mm. The molding product was contained in a graphite container, and sintered in an argon atmosphere at a temperature of 1900° C., thereby obtaining a sintered silicon carbide composite.

The relative density, the specific electrical resistivity and bending strength (three-point bending strength under normal temperature, that is, room temperature) were measured for the sintered silicon carbide composite and the results of the measurement are shown in Table 1.

EXAMPLE 12

Procedures in Example 10 were repeated except for adding 10 g of tantalum carbide (TaC) powder of 3.0 μm in average grain size instead of titanium carbide (TiC) powder.

The relative density, the specific electrical resistivity and bending strength (three-point bending strength under normal temperature, that is, room temperature) were measured for the sintered silicon carbide composite and the results of the measurement are shown in Table 2.

TABLE 1

| | Silicon carbide (g) | Chronium or chromium compound | | | Carbide or boride | | | | Aluminum oxide (g) | Carbon (g) | Relative density (%) | Electrical specific resistivity (Ω-cm) | Bending strength *1 (MPa) |
|---|---|---|---|---|---|---|---|---|---|---|---|---|---|
| | | $CrSi_2$ (g) | $Cr_3C_2$ (g) | Cr (g) | TiC (g) | TaC (g) | $TiB_2$ (g) | $ZrB_2$ (g) | | | | | |
| Example | | | | | | | | | | | | | |
| 1 | 51 | 4 | 0 | 0 | 0 | 0 | 32 | 0 | 10.5 | 2.5 | 98 | $4.5 \times 10^{-4}$ | 670 |
| 2 | 51 | 3 | 0 | 0 | 0 | 0 | 40 | 0 | 3.5 | 2.5 | 98 | $8.2 \times 10^{-4}$ | 630 |
| 3 | 51 | 4 | 0 | 0 | 32 | 0 | 0 | 0 | 10.5 | 2.5 | 97 | $7.3 \times 10^{-3}$ | 480 |
| 4 | 51 | 4 | 0 | 0 | 0 | 32 | 0 | 0 | 10.5 | 2.5 | 95 | $5.2 \times 10^{-3}$ | 450 |
| 5 | 51 | 3 | 0 | 0 | 0 | 0 | 0 | 37.5 | 6 | 2.5 | 96 | $7.8 \times 10^{-4}$ | 520 |
| 6 | 48 | 0 | 3.0 | 0 | 0 | 0 | 41 | 0 | 6 | 2.0 | 98 | $1.0 \times 10^{-3}$ | 660 |
| 7 | 57 | 0 | 0 | 4.0 | 25 | 0 | 0 | 0 | 10.5 | 3.5 | 97 | $1.6 \times 10^{-4}$ | 540 |
| 8 | 53.5 | 0 | 4.0 | 0 | 32 | 0 | 0 | 0 | 10.5 | 0 | 95 | $9.8 \times 10^{-3}$ | 450 |
| 9 | 64.5 | 4 | 0 | 0 | 24 | 0 | 0 | 0 | 7.5 | 0 | 97 | $1.8 \times 10^{-2}$ | 565 |
| Comparative Example | | | | | | | | | | | | | |
| 1 | 76 | 20 | 0 | 0 | 0 | 0 | 0 | 0 | 12 | 4 | 92 | $5.0 \times 10^{-2}$ | 380 |
| 2 | 86 | 0 | 0 | 0 | 10 | 0 | 0 | 0 | 10 | 4 | 90 | $1.4 \times 10^4$ | 450 |

(Note)
*1 Three-point bending strength at room temperature

EXAMPLE 10

After adding 10 g of chromium silicide ($CrSi_2$) powder of 3.0 μm in average grain size and 10 g of titanium carbide (TiC) powder of 2.0 μm in average grain size to 76 g of silicon carbide (SiC) powder of 0.5 μm in average grain size, 120 ml of acetone solution containing 8 g of phenol resin with 50% by weight of carbonization degree was further added and they were mixed under stirring for 100 hours by using a pot-mill made of aluminum, that is, a pot and balls made of aluminum.

Then, after removing the solvent by drying, the agitated mixture was pelletized into a pelletized mixture. Since the pot-mill was made of aluminum, the pelletized mixture was incorporated by about 12% by weight of aluminum oxide ($Al_2O_3$) derived from the wall of the pot and the balls.

The pelletized mixture was molded by using a metal die press and a rubber press into a molding product of 5 mm×5 mm×60 mm. The molding product was contained in a graphite container, and sintered in an argon atmosphere at a temperature of 1900° C., thereby obtaining a sintered silicon carbide composite.

The relative density, the specific electrical resistivity and bending strength (three-point bending strength under normal temperature, that is, room temperature) were measured for the sintered silicon carbide composite and the results of the measurement are shown in Table 2.

EXAMPLE 11

Procedures in Example 10 were repeated except for adding 10 g of zirconium carbide (ZrC) powder of 3.0 μm in average grain size instead of titanium carbide (TiC) powder.

The relative density, the specific electrical resistivity and bending strength (three-point bending strength under normal temperature, that is, room temperature) were measured for the sintered silicon carbide composite and the results of the measurement are shown in Table 2.

EXAMPLE 13

Procedures in Example 10 were repeated except for using 71 g of silicon carbide (SiC) powder and blending 15 g of titanium carbide (TiC) powder.

The relative density, the specific electrical resistivity and bending strength (three-point bending strength under normal temperature, that is, room temperature) were measured for the sintered silicon carbide composite and the results of the measurement are shown in Table 2.

EXAMPLE 14

Procedures in Example 10 were repeated except for adding 10 g of titanium nitride (TiN) powder of 2.0 μm in average grain size instead of titanium carbide (TiC) powder.

The relative density, the specific electrical resistivity and bending strength (three-point bending strength under normal temperature, that is, room temperature) were measured for the sintered silicon carbide composite and the results of the measurement are shown in Table 2.

EXAMPLE 15

After adding 7 g of chromium silicide ($CrSi_2$) powder of 3.0 μm in average grain size and 35 g of titanium boride ($TiB_2$) powder of 2.0 μm in average grain size to 54 g of silicon carbide (SiC) powder of 0.5 μm in average grain size, 120 ml of acetone solution containing 8 g of phenol resin with 50% by weight of carbonization degree was further added and they were mixed under stirring for 50 hours by using a pot-mill made of aluminum, that is, a pot and balls made of aluminum.

Then, after removing the solvent by drying, the agitated mixture was pelletized into a pelletized mixture. Since the pot-mill was made of aluminum, the pelletized mixture was incorporated by about 6.0% by weight of aluminum oxide ($Al_2O_3$) derived from the wall of the pot and the balls.

The pelletized mixture was molded by using a metal die press and a rubber press into a molding product of 5 mm×5 mm×60 mm. The molding product was contained in a graphite container, and sintered in an argon atmosphere at a temperature of 1850° C., thereby obtaining a sintered silicon carbide composite.

The relative density, the specific electrical resistivity and bending strength (three-point bending strength under normal temperature, that is, room temperature) were measured for the sintered silicon carbide composite and the results of the measurement are shown in Table 2.

EXAMPLE 16

Procedures in Example 15 were repeated except for using silicon carbide (SiC) powder of 48 g and titanium boride ($TiB_2$) powder of 38 g, and adding 10 g of chromium carbide ($Cr_3C_2$) powder of 5.6 $\mu$m in average grain size instead of chromium silicide ($CrSi_2$) powder.

The relative density, the specific electrical resistivity and bending strength (three-point bending strength under normal temperature, that is, room temperature) were measured for the sintered silicon carbide composite and the results of the measurement are shown in Table 2.

EXAMPLE 17

Procedures in Example 10 were repeated except for using 71 g of silicon carbide (SiC) powder and adding 15 g of zirconium boride ($ZrB_2$) powder of 8.0 $\mu$m in average grain size instead of titanium carbide (TiC) powder.

The relative density, the specific electrical resistivity and bending strength (three-point bending strength under normal temperature, that is, room temperature) were measured for the sintered silicon carbide composite and the results of the measurement are shown in Table 2.

EXAMPLE 18

After adding 10 g of chromium silicide ($CrSi_2$) powder of 3.0 $\mu$m in average grain size, 10 g of titanium carbide (TiC) powder of 2.0 $\mu$m in average grain size and 10 g of aluminum oxide ($Al_2O_3$) powder of 0.5 $\mu$m in average grain size to 76 g of silicon carbide (SiC) powder of 0.5 $\mu$m in average grain size, 120 ml of acetone solution containing 8 g of phenol resin with 50% by weight of carbonization degree was further added and they were mixed under stirring for 20 hours by using a pot-mill made of plastic, that is, a plastic pot and mono-balls.

Then, after removing the solvent by drying, the agitated mixture was pelletized into a pelletized mixture. Since the pot-mill was made of plastic, no aluminum oxide ($Al_2O_3$) was incorporated from the pot wall or balls different from Example 10.

The pelletized mixture was molded by using a metal die press and a rubber press into a molding product of 5 mm×5 mm×60 mm. The molding product was contained in a graphite container, and sintered in an argon atmosphere at a temperature of 1900° C., thereby obtaining a sintered silicon carbide composite.

The relative density, the specific electrical resistivity and bending strength (three-point pending strength under normal temperature, that is, room temperature) were measured for the sintered silicon carbide composite and the results of the measurement are shown in Table 2.

EXAMPLE 19

Procedures in Example 10 were repeated except for using 80 g of silicon carbide (SiC) powder and adding 4 g of vinyl acetate instead of the phenol resin.

The relative density, the specific electrical resistivity and bending strength (three-point bending strength under normal temperature, that is, room temperature) were measured for the sintered silicon carbide composite and the results of the measurement are shown in Table 2.

TABLE 2

| Example | Silicon carbide (g) | Chromium silicide (g) | Chromium carbide (g) | Chromium (g) | Titanium carbide (g) | Zirconium carbide (g) | Tantalum carbide (g) | Titanium nitride (g) | Titanium boride (g) | Zirconium boride (g) | Aluminum oxide (%*1) | Carbon (g) | Relative density (%) | Electrical specific resistivity ($\Omega$-cm) | Bending strength *2 (MPa) |
|---|---|---|---|---|---|---|---|---|---|---|---|---|---|---|---|
| 10 | 76 | 10 | 0 | 0 | 10 | 0 | 0 | 0 | 0 | 0 | 12 | 4 | 97 | $4.8 \times 10^{-2}$ | 760 |
| 11 | 76 | 10 | 0 | 0 | 0 | 10 | 0 | 0 | 0 | 0 | 12 | 4 | 97 | $2.5 \times 10^{-2}$ | 650 |
| 12 | 76 | 10 | 0 | 0 | 0 | 0 | 10 | 0 | 0 | 0 | 12 | 4 | 96 | $5.5 \times 10^{-2}$ | 620 |
| 13 | 71 | 10 | 0 | 0 | 15 | 0 | 0 | 0 | 0 | 0 | 12 | 4 | 95 | $7.0 \times 10^{-3}$ | 520 |
| 14 | 76 | 10 | 0 | 0 | 0 | 0 | 0 | 10 | 0 | 0 | 12 | 4 | 95 | $5.0 \times 10^{-3}$ | 420 |
| 15 | 54 | 7 | 0 | 0 | 0 | 0 | 0 | 0 | 35 | 0 | 6 | 4 | 96 | $1.0 \times 10^{-3}$ | 500 |
| 16 | 48 | 0 | 10 | 0 | 0 | 0 | 0 | 0 | 38 | 0 | 6 | 4 | 96 | $7.8 \times 10^{-4}$ | 760 |
| 17 | 71 | 10 | 0 | 0 | 0 | 0 | 0 | 0 | 0 | 15 | 12 | 4 | 97 | $7.8 \times 10^{-2}$ | 600 |
| 18 | 76 | 10 | 0 | 0 | 10 | 0 | 0 | 0 | 0 | 0 | 10 | 4 | 95 | $5.5 \times 10^{-1}$ | 540 |
| 19 | 80 | 10 | 0 | 0 | 10 | 0 | 0 | 0 | 0 | 0 | 12 | 0 | 95 | $2.3 \times 10^{-1}$ | 480 |

(Note)
*1 Outer percentage by weight
*2 Three-point bending strength at room temperature and bending strength (three-point bending strength under normal temperature, that is, room temperature) were measured for the sintered silicon carbide compos- As apparent from Tables 1 and 2, according to the present invention, the electrical specific resistivity can be reduced to below 10 ohm-cm and the bending strength can be increased for the sintered silicon carbide composite as compared with comparative examples. Therefore, according to the present invention, the electric discharge machining for the sintered silicon carbide composite can be facilitated and even a shape of greater depth can be fabricated in a short period of time, as well as strength and high toughness can be ensured.

What is claimed is:

1. A sintered silicon carbide composite having a relative density of not less than 93%, a specific electrical resistivity of not greater than 10 ohm-cm and a bending strength of not less than 400 MPa, and prepared by sintering a blend consisting essentially of from 25 to 85% by weight of silicon carbide, from 1 to 25% by weight of at least one of chromium and chromium compound, from 10 to 70% by weight of at least one of carbide, nitride and boride f elements belonging to the groups IVb and Vb of the periodical table, and from 3 to 25% by weight of aluminum oxide, in an inert gas atmosphere at a temperature from 1700° to 2100° in an atmospheric pressure or a reduced pressure.

2. A sintered silicon carbide composite according to claim 1, wherein the blend comprises from 25 to 75% by weight of silicon carbide, from 1 to 5% by weight of at least one of chromium and chromium compound, from 20 to 70% by weight of at least one of carbide and boride of elements belonging to the groups IVb and Vb of the periodical table and from 3 to 25% by weight of aluminum oxide.

3. A sintered silicon carbide composite according to claim 1, wherein the blend comprises from 40 to 85% by weight of silicon carbide, from 5 to 25% by weight of at least one of chromium and chromium compound, from 10 to 50% by weight of at least one of carbide, nitride and boride of elements belonging to the groups and Vb of the periodical table, and from 5 to 25% by weight of aluminum oxide.

4. A sintered silicon carbide composites according to claim 1, wherein the total blending amount of at least one of chromium and chromium compound, and at least one of carbide, boride and nitride of the elements belonging to the groups IVb and Vb of the periodical table is from 20 to 60% by weight.

5. A sintered silicon carbide composite according to claim 2, wherein carbon is added by not greater than 6% by weight based on the silicon carbide.

6. A sintered silicon carbide composite according to claim 3, wherein carbon is added by not greater than 10% by weight based on the silicon carbide.

7. A sintered silicon carbide composite according to claim 1, wherein the chromium compound is chromium carbide or chromium silicide.

* * * * *